United States Patent [19]
Skibinski

[11] Patent Number: 5,831,410
[45] Date of Patent: Nov. 3, 1998

[54] APPARATUS USED WITH AC MOTORS FOR ELIMINATING LINE VOLTAGE REFLECTIONS

[75] Inventor: Gary Skibinski, Milwaukee County, Wis.

[73] Assignee: Allen Bradley Company, Inc., Milwaukee, Wis.

[21] Appl. No.: 799,737

[22] Filed: Feb. 12, 1997

Related U.S. Application Data

[63] Continuation of Ser. No. 334,294, Nov. 4, 1994, abandoned.

[51] Int. Cl.$^6$ ........................................................ H02P 7/00
[52] U.S. Cl. .............................. 318/807; 361/23; 318/434
[58] Field of Search ........................... 312/729, 798–815, 312/434; 307/105; 361/40, 44–46, 50, 55, 123–130, 174, 175, 23–33, 91, 111, 112, 113

[56] References Cited

U.S. PATENT DOCUMENTS

| | | |
|---|---|---|
| 3,668,507 | 6/1972 | Kadomsky et al. ..................... 363/126 |
| 3,675,110 | 7/1972 | Kelly, Jr. .................................... 363/50 |
| 4,047,097 | 9/1977 | Gyugi et al. ......................... 361/113 X |
| 4,328,474 | 5/1982 | Goodman et al. ...................... 333/176 |
| 4,622,474 | 11/1986 | Christl et al. ............................ 307/105 |
| 4,670,699 | 6/1987 | Yang ................................... 318/729 X |
| 4,673,860 | 6/1987 | Machuron ................................ 318/812 |
| 4,700,288 | 10/1987 | Baraban ................................. 363/96 X |
| 4,967,334 | 10/1990 | Cook et al. ............................... 363/34 |
| 5,251,120 | 10/1993 | Smith ....................................... 363/44 |
| 5,444,609 | 8/1995 | Swamy et al. ............................ 363/47 |

*Primary Examiner*—Jonathan Wysocki
*Attorney, Agent, or Firm*—Michael A. Jaskolski; John M. Miller; John J. Horn

[57] ABSTRACT

A termination network to be used with an induction motor for eliminating voltage reflections and voltage surges due to voltage reflections, the network includes a resistive element in series with a capacitive element between each two voltage supply lines. The capacitive element initially operates like a short so that a resistive element terminates each line for a short period, the termination network impedance matches the line impedance, and reflection is eliminated. After a voltage pulse passes to a stator winding the capacitor element is charged and the resistive element is effectively removed from the line circuit.

9 Claims, 6 Drawing Sheets

L-R-C FILTER

FIG. 6(b) PRIOR ART

L-C-D FILTER

FIG. 6(c) PRIOR ART

LC FILTER

APPARATUS USED WITH AC MOTORS FOR ELIMINATING LINE VOLTAGE REFLECTIONS

This is a continuation of Ser. No. 08/334,294 filed on Nov. 4, 1994 now abandoned.

BACKGROUND

1. Field of the Invention

The present invention relates to three phase AC motors. More particularly, the present invention relates to an apparatus for eliminating reflected voltage waves on the terminal lines between voltage source invertors and an AC motor.

2. Description of the Art

One type of commonly designed induction motor is a three phase motor having three Y-connected stator windings. In this type of motor, each phase's stator winding is connected to an AC voltage source by a separate supply line, the source generating currents therein. Often, an adjustable speed drive (ASD) will be positioned between the voltage source and the motor to control motor speed.

One commonly used type of ASD includes a pulse width modulated (PWM) voltage source invertor (VSI) which can control both voltage and frequency of signals that eventually reach the stator windings. While high frequency pulse width modulation allows motor speed control, high frequency pulses disadvantageously produce reflected voltage waves which can cause the deterioration of both motor components and voltage supply lines.

PWM VSI invertors operate by converting a DC voltage into a series of high frequency AC voltage pulses. PWM invertors can control the widths of the positive and negative phase portions of each pulse, thus producing a changing average voltage. All of the high frequency pulses are received at the motor terminals and their changing average over a period defines a fundamental low frequency alternating voltage at the motor terminals. The amplitude of the low fundamental frequency voltage can be controlled by adjusting the ratio of positive to negative phase portions of each high frequency pulse. The frequency of the low fundamental frequency voltage can be controlled by altering the period over which the average high frequency pulses alternate from positive to negative phase. Depending upon its design, a given PWM can produce a fundamental low frequency alternating voltage having a range of different frequencies to drive a motor at many different speeds.

Figure 3:
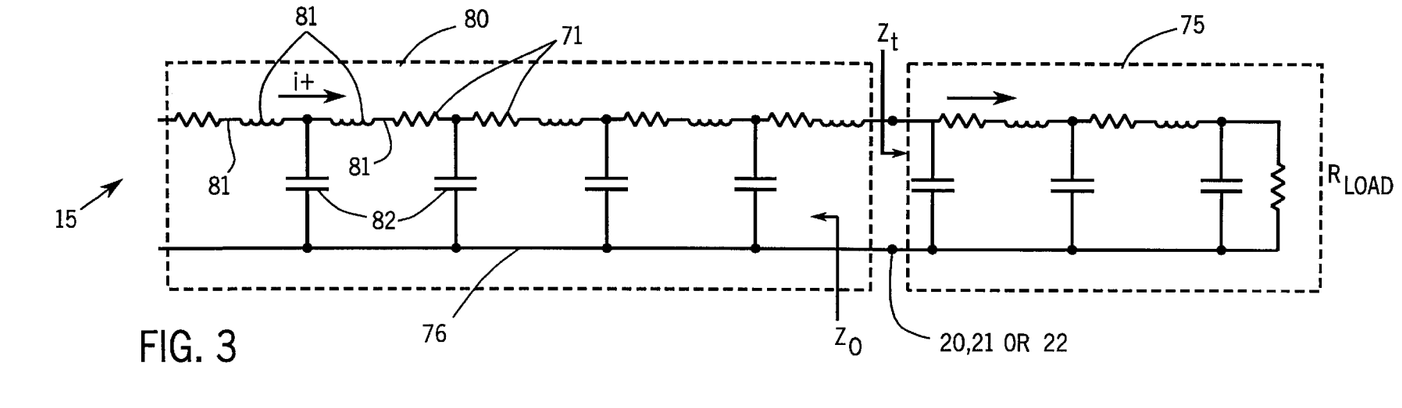
FIG. 3 is a schematic diagram of the high frequency equivalent circuits of both a supply line and a stator winding.

Referring to FIG. 3, a transmission line 80 such as may be used as supply line 80 to an AC motor can be represented by a "π" distributed equivalent circuit per unit length of cable. The π distributed circuit includes a plurality of inductors 81, resistors 82, and capacitors 82, the inductors 81 and resistors 82 arranged in series and the capacitors 82 arranged in parallel, one capacitor 82 connecting a point between each resistor and inductor pair to the reference return line 76. Looking back along the supply line 80 from a stator terminal 20, 21, or 22 toward a voltage source 15, a supply line 80 will have a characteristic impedance $Z_0$ in OHMS equal to $\sqrt{L/C}$ where L is the line inductance 81 in Henrys per meter and C is the line capacitance 82 in Farads per meter. As a high frequency voltage pulse $e^+$ emitted from the PWM VSI travels along the supply line 80, it produces a current $i^+ = e^+/Z_0$.

The high frequency equivalent circuit of a stator winding 75, like a transmission line, can also be represented by a π distributed equivalent circuit made up of capacitors, inductances and resistors. This circuit model is different from the standard low frequency (60 Hz) induction motor model. Therefore, the stator winding 75 responding to the high frequency voltage pulses also has a high frequency characteristic impedance $Z_t$, where the supply line is terminated. At termination it must be true that:

$$\frac{\text{Total } e}{\text{Total } i} = Z_t \quad (1)$$

where Total e is the voltage across the stator winding and Total i is the current through the stator winding.

When high frequency voltage pulses are produced, unless $Z_t = Z_0$, part of the incident wave $e^+$ will be reflected back toward the voltage supply 15 thus producing a reflected voltage $e^-$. The reflected voltage $e^-$ and associated reflected current $i^-$ are related to the line impedance by the equation $i^- = e^-/Z_0$. At the termination, Equation 1 can be rewritten as:

$$\frac{e_t^+ + e_t^-}{i_t^+ + i_t^-} = Z_t \quad (2)$$

where the subscript t refers to values at the point of termination at the stator winding.

Equation (2) can be rewritten in terms of $Z_0$ as $$\frac{e_t^+ + e_t^-}{e_t^+/Z_0 - e_t^-/Z_0} = Z_t \quad (3)$$

Solving Equation (3) for a ratio of reflected to incident voltage:

$$\frac{e_t^-}{e_t^+} = \frac{Z_t - Z_0}{Z_t + Z_0} = K \quad (4)$$

The ratio K is called the reflection co-efficient. K will be zero and there will be no reflection at the termination only when the terminating impedance $Z_t$ is equal to the characteristic impedance $Z_0$ of the line.

Often, when the terminating impedance $Z_t$ is different than the line impedance $Z_0$, the reflected waves $e^-$ and incident waves $e^+$ combine to form standing waves having an amplitude that can be as much as twice the amplitude of the incident wave, thus forming a voltage surge at the motor terminals. Importantly, the stator high frequency terminal impedance $Z_t$ is usually quite different and several orders of magnitude greater than the line impedance $Z_0$. Thus, voltage surges are a common phenomenon in the motor control industry.

The magnitude of the motor terminal voltage surge depends upon the characteristic motor termination impedance $Z_t$, cable impedance $Z_0$, the cable length and the steep front rise and fall times of the high frequency PWM pulses and may be estimated using standard transmission line standing wave theory. The rise time of the steep front high frequency PWM pulses is essentially fixed by the VSI semiconductor device switching times and varies with device technology as shown in Table I. An equivalent frequency ($f_E$) and wavelength (λ) of the traveling incident wave $e^+$ may be defined using Equations (5) and (6) below.

$$f_E = \frac{1}{\pi t_{rise}} \quad (5)$$

$$\lambda = \frac{c}{f_E} \quad (6)$$

where c is the speed of light, and $t_{rise}$ is the rise time. A critical cable length equal to or greater than λ/4 results in twice the amplitude of the incident wave at the motor terminals when $Z_t >> Z_0$, as is often the case. From standing wave theory, a cable length less than (λ/10) will replicate the invertor produced high frequency PWM pulse without over voltage at the motor terminals.

TABLE I

Effect of Invertor Semiconductors on AC Motor Voltage Surge

| Semiconductor Device Type | Rise Time | Voltage Surge At Motor | |
|---|---|---|---|
| | | Twice $V_{DC}$ at (λ/4) | $V_{DC}$ Bus at (λ/10) |
| Gate Turnoff Thyristor (GTO) | 1 ms | 774 ft | 309 ft |
| Bipolar Junction Transistor (BJT) | 0.3 ms | 386 ft | 155 ft |
| Insulated Gate Bipolar Transistor (IGBT) | 0.07 ms | 54 ft | 29 ft |

Presently, the widespread use of IGBT technology with its fast rise and fall switching times produces twice DC bus voltage surges at the motor terminals for drive-motor cable distances exceeding 54 ft. Since this distance is exceeded in practically 100% of all drive applications, there is now an urgent need to conceive a simple yet effective apparatus used with AC motors for eliminating line voltage reflections.

Voltage surges are generally recognized as undesirable for a plurality of reasons. For example, the supply lines that supply the voltage to a motor are electrically insulated to withstand a specified level of voltage. Under normal circumstances where supply line voltage is less than the specified level, supply line insulation functions properly for much longer than the life of the motor. However, the useful life of a supply line can be cut short where the voltage passing through the supply line regularly exceeds the level of voltage for which the supply line was designed.

Voltage surges caused by reflected waves often present voltage having an amplitude high enough to damage supply line insulation. Insulation failure can lead to high voltage short circuit problems which can, in turn, lead to costly damage of other motor components as well.

In addition to damaging line insulation, a voltage surge can directly damage a stator winding if the surge penetrates, and is mostly absorbed by, the initial coils of the stator winding. A stator winding is an iterative structure having a plurality of series connected winding coils.

When a voltage enters a stator winding, the voltage propagates along the winding beginning with the first coil. Some of the voltage is absorbed in the first coil and the rest is propagated onto the latter coils. Ideally, the voltage is designed to be distributed evenly among the coils under steady sinewave voltage operation.

In reality, however, because of the reflected voltage waves impressed on the invertor square wave pulse shape of a voltage surge, voltage distribution can be unevenly distributed and result in undue and potentially damaging dielectric stress on certain of the motor windings. Modern semiconductor switches used in PWM invertors and other types of invertors produce voltage pulses having relatively fast rise times and thus having steep front ends. A voltage surge enhances the vertical aspect of the front end of each pulse and produces an exceedingly steep front end.

When an exceedingly steep voltage surge of twice DC bus amplitude enters a stator winding, the voltage difference across the first few coils is extremely high as the potential difference across adjacent windings increases rapidly. The turn-to-turn stray capacitance of the first coil is the first parasitic component to encounter the incoming voltage surge and takes the brunt of the surge before an attenuated voltage wave propagates onto the latter coils.

The stator winding insulation, like the line insulation, can be irreparably damaged by repetitive twice amplitude voltage surges occurring at the invertor semiconductor switching rate, typically 2 KHZ to 15 KHZ with IGBT invertors. Insulation burnout is particularly problematic in the case of stator winding insulation as winding insulation must be minimized to maintain a compact motor design.

Figure 6A:
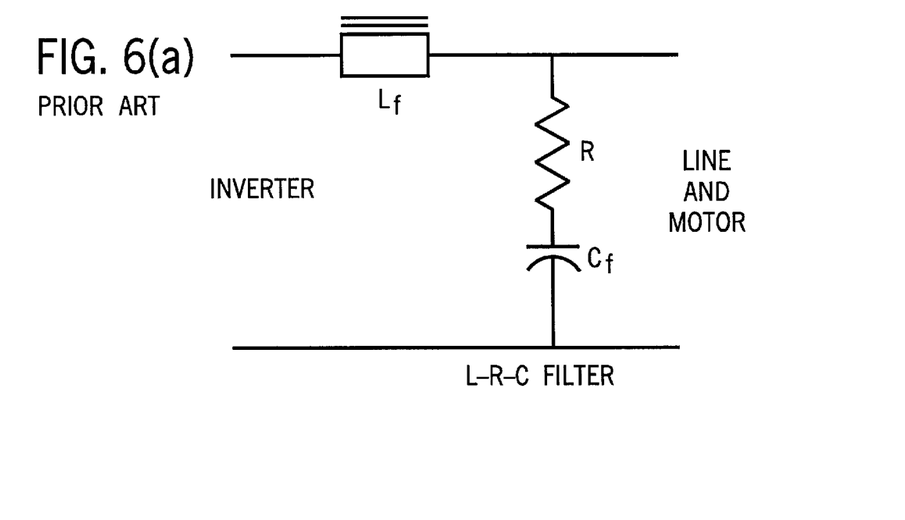
FIGS. 6(a)–(c) are schematic diagrams showing prior art invertor output filters.
Figure 6B:
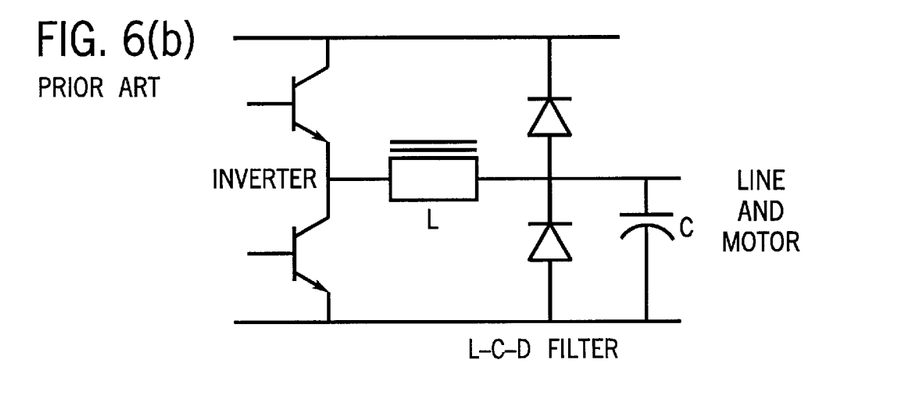
Figure 6C:
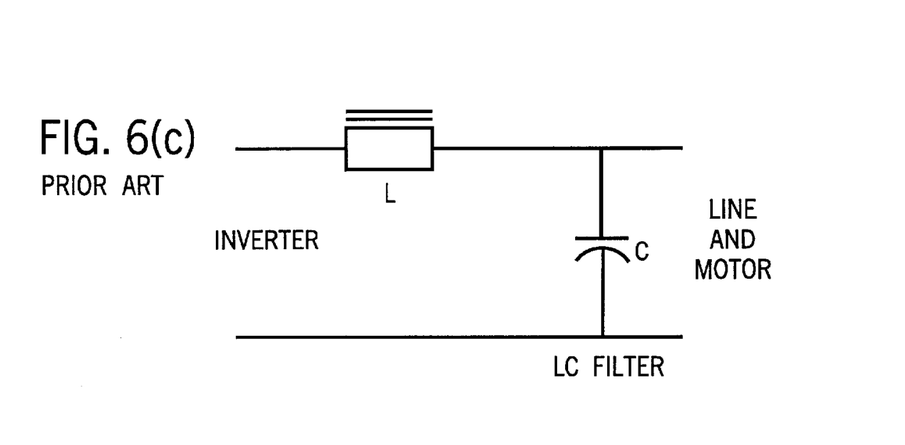

In order to eliminate motor voltage surges due to reflected voltage waves, the industry has employed bulky inductance (L), resistance (R), and capacitance (C) filter networks applied directly to the invertor output terminals. Conventional L-R-C, L-C-D and L-C filters previously used are shown in FIGS. 6(a)–(c). Under some circumstances the L-C-D arrangement shown in FIG. 6(b) can be more efficient than the L-R-C and L-C arrangements shown in FIGS. 6(a) and (c) respectively, since it returns trapped inductive energy to the DC bus by way of two diodes D. However, the majority of IGBT modules have the rectifier diode (D) packaged with the IGBT device as a single inseparable unit so that the L-C-D arrangement is physically impossible to obtain.

These filter solutions function by adjusting the L-R-C filter constants so that the rise and fall time wavefronts of each PWM square wave pulse emitted from the invertor has a sloped wavefront when the pulse reaches the cable termination at the motor.

The minimum allowable sloped $t_{rise}$ and $t_{fall}$ times are chosen so that the critical cable length corresponding to twice pulse voltage at ($\lambda_{sloped}/4$), from Equation 6 is longer than the actual cable distance. The desirable sloped $t_{rise}$ and $t_{fall}$ times are chosen so that the critical cable length corresponding to no reflected waves at ($\lambda_{sloped}/10$), is longer than the actual cable distance.

Thus, the conventional filter networks limit the magnitude of the surge voltage at the motor terminals by altering the slope of the wavefront of the PWM pulse. With conventional networks, the exact motor terminal surge voltage magnitude is determined by size, cost, and complexity of the receiving L-R-C components. Thus, the reduced voltage magnitude reduces the dielectric voltage stress across the first few coils and minimizes the possibility of damaging the stator windings. In addition, as the voltage surge is minimized, the insulation of the supply lines is protected.

While this solution does reduce and possibly eliminate voltage reflections and thus protects both stator windings and line insulation, this is a very awkward solution to the voltage surge problem for a number of reasons. First, a reactor that can adequately slope the front end of an incoming surge to the point where the possibility of stator winding damage is eliminated must employ large inductors and capacitors. In many cases, the physical space occupied by a single reactor might be as large as the motor drive volume itself. Furthermore, as voltage reflection is a problem on all three supply lines of a three phase motor, three reactors are needed, one reactor on each of the three supply lines.

Second, reactors are relatively inefficient. When a series output reactor slopes the front of an incoming PWM pulse, it dissipates a considerable amount of energy, since rated motor current flows through the terminals. Also when a series output reactor slopes the front of an incoming PWM pulse it may have a considerable potential voltage drop across its terminals. For example, where a voltage source supplies 460 volts, it is not uncommon for a reactor to drop as much as 40 of 50 RMS volts peak to slope the voltage surge to the point where the possibility of stator winding damage is eliminated. A reduction of applied motor voltage reduces the output torque and derates rated horsepower, since torque is proportional to the square of root means square terminal voltage.

Third, because each reactor incorporates large magnetic core components and large components are expensive, each reactor is relatively expensive.

Thus, it would be advantageous to have a termination network which is relatively compact, efficient, and inexpensive which could eliminate the propensity for voltage surges due to reflected waves.

SUMMARY OF THE INVENTION

Series reactors applied at the invertor output used to protect supply lines and stator windings operate on the principle of receiving a voltage surge, absorbing a significant portion of the front end of the surge, and passing on a voltage wave having an attenuated front end to the motor. Rather than absorbing the front end of a voltage surge, the present invention includes a parallel termination network that allows a voltage pulse from an invertor to pass onto a stator winding without reflection while eliminating the possibility of a voltage surge higher than the original invertor output pulse.

The present invention is an apparatus which eliminates reflected line voltages on the supply lines of an AC induction motor wherein the motor has three stator windings and each stator winding is connected separately to a voltage source by either a first, second or third supply line.

The apparatus comprises a first electrically resistive element positioned between the first and second supply lines; a first voltage storage element positioned in series with the first resistive element between the first and second supply lines; a second electrically resistive element positioned between the second and third supply lines; a second voltage storage element positioned in series with the second resistive element between the second and third supply lines; a third electrically resistive element positioned between the third and first supply lines; and a third voltage storage element positioned in series with the third resistive element between the third and first supply lines.

In a preferred apparatus the resistive elements are resistors and each voltage storage element is at least one capacitor.

Therefore, one object of the invention is to provide an apparatus for eliminating reflected voltage waves produced by impedance differences between stator windings and supply lines. The capacitor between each two supply lines is initially uncharged and initially appears as a short circuit to the steep front invertor pulses. Thus, if the resistor in series with each capacitor is chosen so that it has a resistance value $R_0$ to the characteristic impedance $Z_0$ of the supply lines, then initially during the pulse wavefront $R_0$, the resistance across the two lines is identically equal to the supply line characteristic impedance. Under these circumstances, according to Equation 4, the reflected voltage is eliminated. Once the capacitor charges up a short time after the wavefront peak voltage is reached, the capacitor operates like an open circuit and the resistor, in effect, no longer has an effect on the circuit (i.e. no longer dissipates power).

Other objects of the invention are to eliminate voltage reflections on the supply lines in a cost effective manner and to configure a termination network that is relatively compact. Because the capacitors and resistors needed to build the termination network of the present invention are small relative to the elements used to build reactors, the configuration of the present invention is relatively small. In a preferred embodiment, the present invention can be configured to fit on the end of a motor terminal junction box. In addition, because low μf capacitor and low wattage resistance is used, the elements used to configure the present invention are small in size and inexpensive.

Yet another object of the present invention is to provide an efficient termination network for use with an AC motor wherein the network absorbs only a small amount of energy and does not have a series potential voltage drop reducing motor terminal voltage. The series output reactors used by the industry protect the lines and stator windings from damage by dropping some of the voltage at the front end of each voltage surge but are highly inefficient because full rated motor current must flow through it creating high copper loss and also core loss due to the high frequency PWM output voltage.

In contrast, the present invention eliminates the possibility of reflected voltage surges and yet by virtue of its parallel termination passes virtually all of the invertor output voltage of a pulse to the stator windings so that motor derating is unnecessary. Also because of the parallel connection of the termination network the losses associated with any series element conducting rated motor current are eliminated. The only losses accrued are those associated with the short time charging and discharging of the termination capacitor at the PWM carrier switching frequency rate, which is a small fraction of the losses that occur in the conventional L-R-C output filter design.

In a preferred apparatus, the resistors are variable resistors which can produce a non-inductive resistance between 50Ω and 250Ω.

Thus, another object of the invention is to provide a termination network that is versatile and can be used with any commonly employed three phase power supply line. Applicant has noted from experimental results and equations defining the L and C cable constants that the characteristic impedance of almost all bundled three phase power transmission cables currently used as supply lines in motor design is between 50Ω and 250Ω. Thus, by adjusting the variable resistors, the impedance of the termination network can be matched with the impedance of any supply line and can be used to eliminate the occurrence of reflected voltages in any supply line.

Also, preferably the apparatus includes three jumper terminals, one jumper terminal positioned between each of the first, second, and third resistive elements and an adjacent voltage storage element, and each of the first, second, and third resistive elements consists of a plurality of resistors in series; a plurality of resistor terminals, one resistor terminal extending from between each two adjacent resistors; and a jumper wire having a fixed end and a free end, the fixed end connected to the jumper terminal and the free end moveable; whereby the free end can be maneuvered between positions, wherein the free end may contact each of the resistor terminals separately thus bypassing certain of said resistors.

Thus, another object of the present invention is to provide an adjustable termination network that has discrete adjustment characteristics so that the network does not operate as a source of circuit unbalance. By allowing only discrete non-inductive resistor values rather than a fully variable resistor, where a user chooses three identical resistor values to terminate the three supply lines, the termination network will not operate as a source of voltage unbalance.

Other and further aspects of the present invention will become apparent during the course of the following description and by reference to the accompanying drawings.

DETAILED DESCRIPTION OF THE PREFERRED EMBODIMENT

Figure 1:
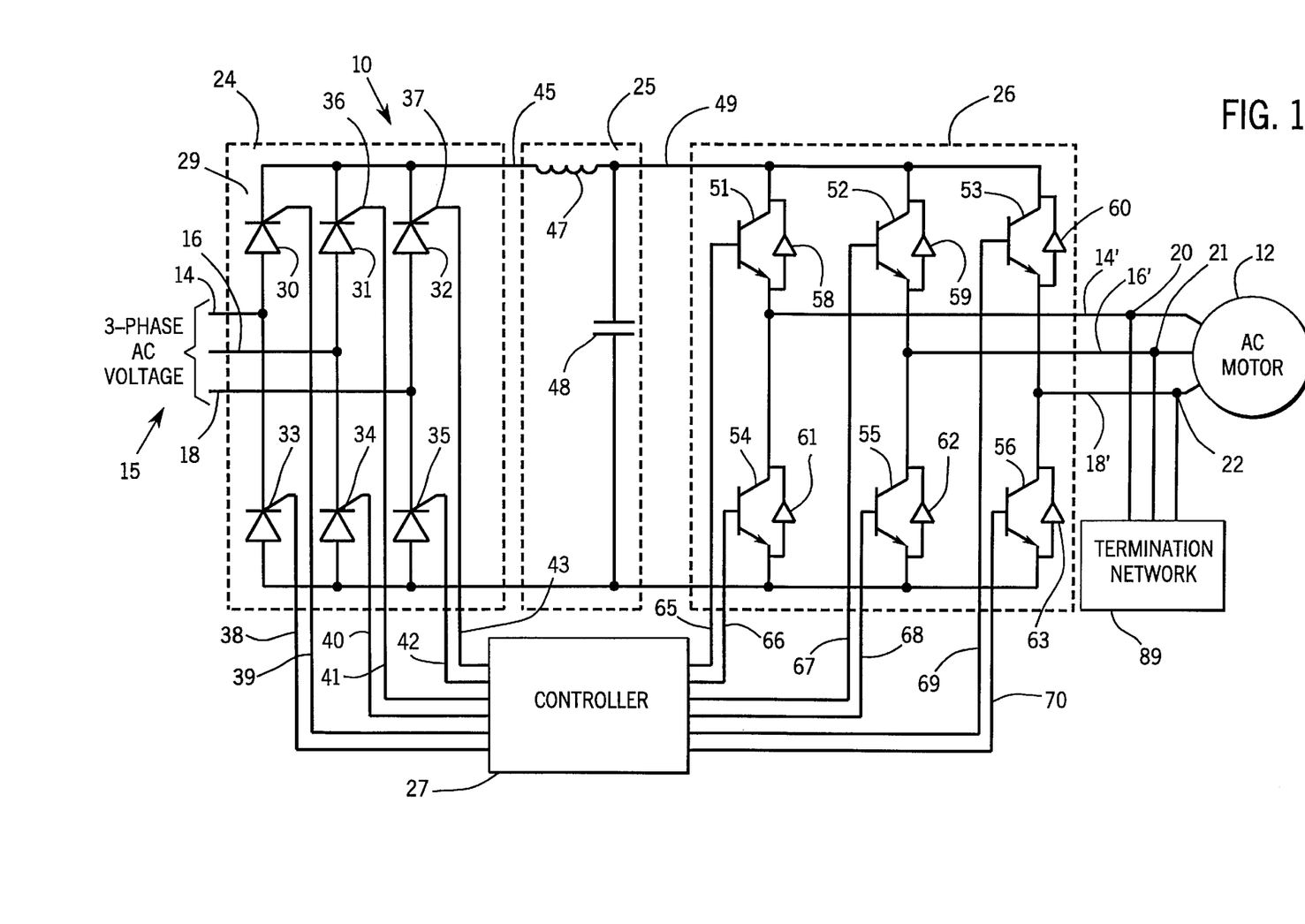
FIG. 1 is a schematic diagram of a motor control system including the termination network of the present invention.

The present invention will be described in the context of the exemplary variable frequency motor control system 10 shown in FIG. 1. The control system 10 receives three phase alternating voltage 15, converts the alternating voltage to a direct voltage, converts the direct voltage back to alternating voltage with a chosen frequency in a manner to be described below, and delivers the alternating voltage to a motor 12 along supply lines 14', 16', and 18'.

The induction motor 12 has three stator windings (not shown) which are coupled in a "Y" configuration as well known in the art. The distal end of each stator winding is connected to a separate supply line 14', 16', 18' at motor terminals 20, 21, and 22 respectively. The phase of the voltage on supply line 14' leads the phase of the voltage on supply line 16' which in turn leads the phase of the voltage on supply line 18'.

The motor control system 10 consists of a rectifier circuit 24, a storage circuit 25, an invertor circuit 26, and a controller 27. The present invention includes a termination network 89 positioned between the invertor circuit 26 and applied directly at the motor 12 terminals as described below.

The rectifier circuit 24 includes six solid state switching devices 30–35 which are arranged in a bridge configuration forming three pairs of series switches 29, 36 and 37. The three switch pairs are positioned parallel to each other. Each supply line 14, 16, 18 is electrically coupled between the two switching devices of a unique switch pair 29, 36 and 37. In a preferred embodiment, the switching devices 30–35 are thyristors.

The controller 27 provides firing pulses to each switch 30–35 along control lines 38–43 which fire the switches 30–35 in a sequence that effectively changes the three phase alternating voltages into an average direct voltage with some AC voltage harmonic content on line 45. The direct voltage 45 is provided to the storage circuit 25 which consists of an inductor 47 and a capacitor 48 that "filtered" the noisy direct voltage producing a pure direct voltage with no AC ripple voltage as well known in the art. Thus, a "filters" direct voltage is provided on line 49.

The invertor circuit 27 receives the direct voltage. The invertor circuit 27, like the rectifier circuit 26, consists of six solid state switching devices 51–56 (a BJT, GTO, IGBT or other transistor technology device may be used), each switching device 51–56 being coupled with an inverse parallel connected diode 58–63.

The controller 27 provides firing pulses along control lines 65–70 to the switching devices 51–56 turning them on and off in a sequence that provides a series of high frequency voltage pulses at nodes between associated pairs of devices 51–56. These nodes are common to motor terminals 20, 21 and 22. The diodes 58–63 must be included to allow for an alternate path for the inductive motor current which continues to flow when its associated switching device 51–56 is turned off.

Figure 2:
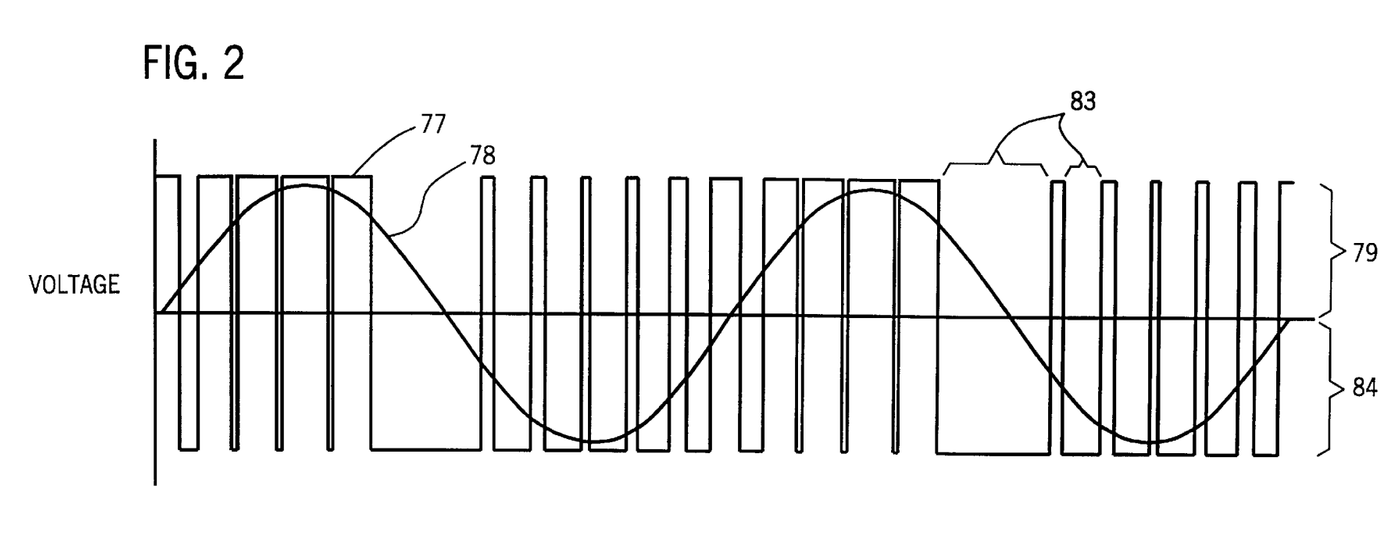
FIG. 2 is a graph illustrating the high frequency pulses and the resulting fundamental low frequency alternating voltage applied to a stator winding by a PWM invertor and to which motor torque responds.

Referring to FIG. 2, an exemplary sequence of high frequency pulses 77 that might be produced by one pair of switching devices of the invertor circuit 26 can be observed along with a fundamental low frequency alternating voltage 78 that is produced at an associated motor terminal 20, 21, 22. By varying the widths of the positive portions 79 of each high frequency pulse relative to the negative portions 84 over a series of pulses 77, an average value of pulse voltages which alternates sinusoidally can be generated. The average values define a fundamental low frequency alternating voltage 78.

By changing the widths of the positive 79 and negative 84 phase positions of the high frequency pulses 77, both the amplitude and the frequency of the fundamental low frequency alternating voltage 78 can be controlled.

While this type of motor controller 10 allows a user to choose different motor speeds and thus allows any given motor to be used in many different ways, as indicated above, the high frequency pulses 77 cannot be fully absorbed by the stator windings and thus produce reflected voltages which result in standing waves and voltage surges along supply lines 14', 16', and 18'.

Figure 4:
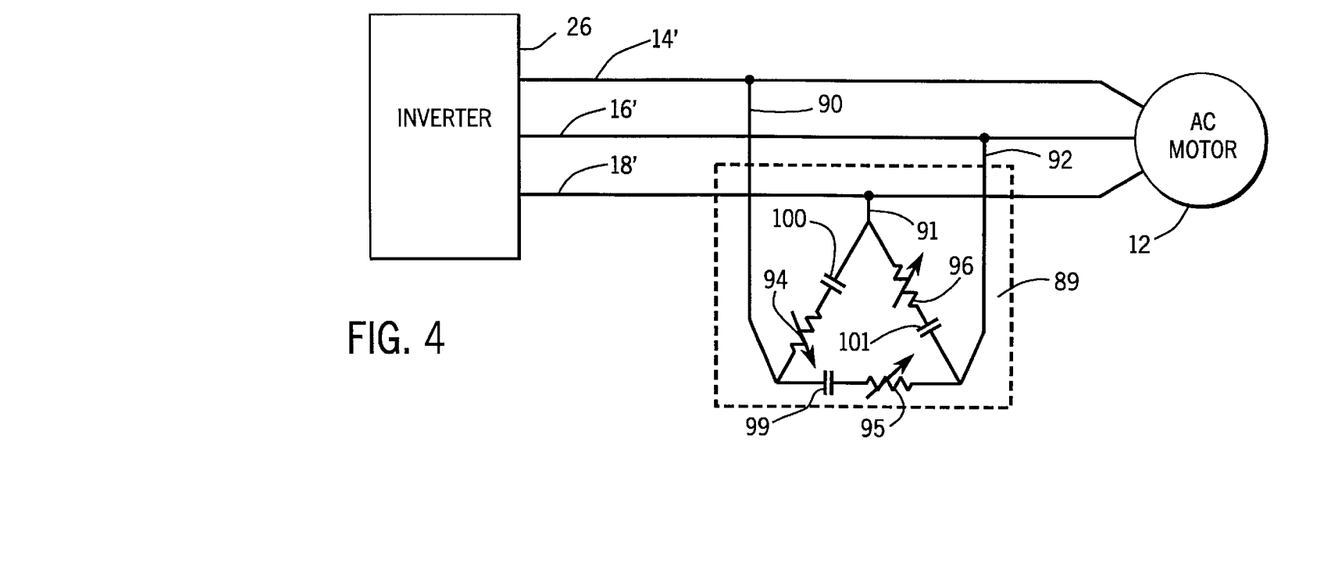
FIG. 4 is a schematic of the termination network of the present invention connected to three supply lines.

Referring again to FIG. 1, the present invention includes a termination network 89 which is connected by three network lines 90–92 to motor terminals 20, 21, 22. Referring also to FIG. 4, besides the network lines 90, 91 and 92, the termination network also includes three resistors 94, 95, and 96 and three capacitors 99, 100, and 101. The resistors and capacitors are arranged such that one resistor 94 is in series with one capacitor 100 between lines 14' and 18', a second resistor 96 is in series with a second capacitor 101 between lines 16' and 18', and a third resistor 95 is in series with the third capacitor 99 between lines 14' and 16'.

The termination network 89 will be explained with respect to the voltage between lines 14' and 16'. The resistors and capacitors between lines 14' and 18' and lines 16' and 18' operate in the same way as the resistor and capacitor between lines 14' and 16'.

When a high frequency pulse is initially provided on line 14', capacitor 99 is uncharged and operates initially as a short circuited conductor so that resistor 95 effectively connects lines 14' and 16' and operates to terminate line 14'. The value of resistor 95 should be identical to the characteristic impedance $Z_0$ of supply line 14'. If resistor 95, functioning initially as a terminating impedance $Z_t$, has been chosen properly, so that its ohmic impedance is equal to, or nearly equal to, the supply line 14' characteristic impedance, according to equation 4, there will be no reflected voltage along line 14' and the high frequency pulse will be absorbed by the stator winding.

Importantly, because the termination network 89 eliminates voltage reflections, the steepness of the front end of the voltage pulse remains at a slope that will not damage the stator windings. Because the slope of the front end is less steep, the potential drop across the first few coils of the winding is limited, and the potential of the voltage pulse propagates and is distributed throughout the stator winding coils.

The high frequency pulse rapidly charges the capacitor 99. By the time the capacitor 99 becomes fully charged, most of the voltage in the high frequency pulse is absorbed evenly across the stator windings. As the capacitor 99 nears a fully charged state its conductance is decreased until the resistor 95 is effectively removed from between lines 14' and 16'. At this point, any portion of the high frequency pulse that has not been absorbed by the stator windings is at a relatively low amplitude that should not damage the line insulation or the stator windings. Importantly, the capacitor 99 should be chosen so that its charge time is less than the period for the positive phase of a voltage pulse on line 14' for the shortest voltage pulse possible. The charge time to fully charge capacitor 99 is optimally 3 times the invertor output pulse rise time.

Referring again to FIG. 2, during the negative portion 84 of each high frequency pulse 77, the capacitor 99 discharges so that when the next high frequency pulse reaches the termination network 89 the capacitor 99 operates as a short circuit and the pulse encounters resistor 95 for a short time.

Thus, instead of producing reflected voltages along line 14', the termination network of the present invention eliminates voltage reflections without effecting the slope of the front end of the high frequency pulses.

Importantly, the capacitors 99, 100, 101 in the termination network 89 are small compared to the capacitors and inductors used in conventional output filters. Therefore, the termination network of the present invention eliminates voltage reflections without dropping an appreciable portion of voltage supplied by the invertor circuit 27.

It has been recognized that, while the capacitance and inductance varies considerably between the different cables used as supply lines in motor systems, the impedance for all types of cables is usually between 50Ω and 250Ω. This means that the resistors 94, 95, and 96 that should be used in the termination network 89 vary according to the cables used.

To accommodate all types of cable with a single termination network 89, in a preferred embodiment, the resistors 94, 95, and 96 in the termination network 89 are variable resistors that allow a user to adjust the resistance between lines 14', 16', and 18' within the range of 50Ω to 250Ω.

Figure 5:
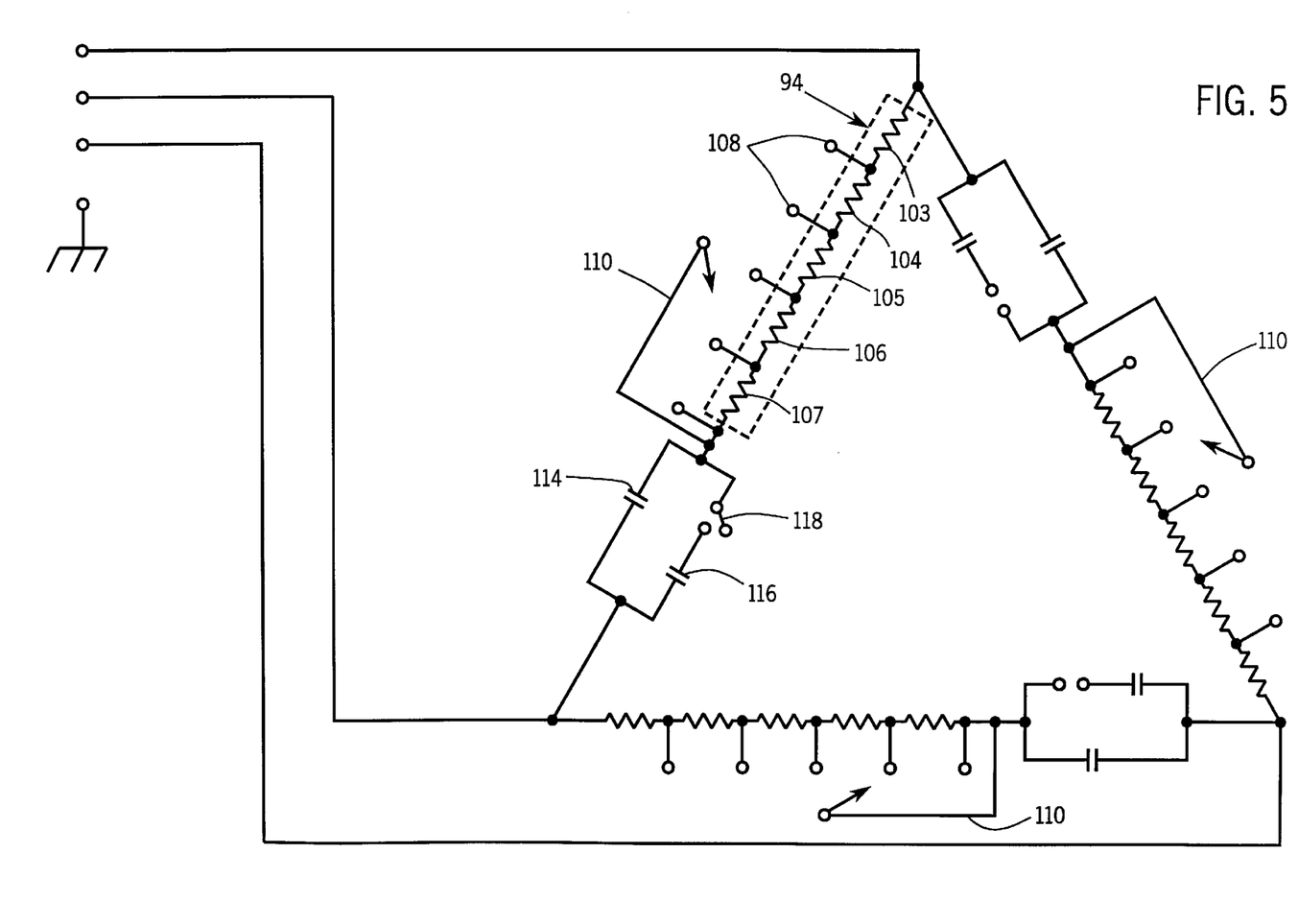
FIG. 5 is a detailed schematic of an adjustable termination network.

Referring to FIG. 5, in another preferred embodiment, the termination network 89 is configured so that a user can only choose between discrete resistive values for resistors 94, 95, and 96. In this embodiment, each resistor 94, 95, and 96 shown in FIG. 4 includes a plurality of resistors in series. For example, resistor 94 includes series resistors 103–107. A resistor terminal 108 extends from between each two adjacent resistors 103–107. A jumper wire 110 is connected at one end of the resistors 103–107 and has a free end which can be maneuvered into a position where it will connect to any of the resistor terminals 108 thus bypassing some of the resistors 103–107.

In a preferred embodiment, resistor 103 should be 50Ω, and resistors 104–107 should be 50Ω each. By adjusting the jumper wire 110 to bypass certain of the resistors, the series resistors 103–107 can be combined so that resistance between 50Ω and 250Ω, in increments of 50Ω can be achieved. In addition, preferably the resistors positioned between all three supply lines 103–107 are identical.

While discrete resistor values do not allow a user to match line and termination impedances exactly, a user can nearly match impedances and nearly eliminate voltage reflection using discrete resistor values. Discrete resistor values are advantageous because they eliminate a possible source of unbalanced circuit operation.

Given a specific type of cable, and discrete resistor values, there is only one, and at most two, discrete values that would reasonably be chosen to terminate the line. For example, if the resistive values that can be chosen using the termination network 89 are 50, 100, 150, 200, and 250Ω and the known impedance of a line is 215Ω, the reasonable resistive value to choose would be 200Ω (or perhaps 250Ω).

Thus, a user would maneuver the three jumper wires 110 so that each jumper wire contacts the resistor terminal 108 that selects the 200Ω discrete resistor value. This would ensure that the resistance between all three supply lines 14', 16', 18' is identical so that the effects of the termination network 89 on all three lines 14', 16', and 18' would be identical. If the resistance between the lines 14', 16', and 18' is not identical, small reflections on one line might be different than small reflections on another and the stator windings would be driven by an unbalanced source. Discrete resistor values remove this possible source of unbalance.

In addition, discrete resistor values would eliminate one variable affecting cable motor impedance matching, during initial setup operation. A fully variable resistor may lead to constant operator adjustment of the resistor values in an effort to better match the resistor values to the line impedances further complicating the initial setup procedure. Unequal adjustments of the termination network resistors on the different phases would change the circuit balance which would complicate the task of monitoring motor terminal reflected voltages during setup.

Referring still to FIG. 5, in the preferred embodiment, each capacitor 99, 100, 101 shown in FIG. 4 consists of two parallel capacitors 114, 116 arranged in series with resistors 103–107 on the side of the jumper wire 110 opposite the resistors. A switch 118 is provided in series with one of the capacitors 116. The switch 118 can be opened or closed to alter the capacitance between lines. By altering the capacitance, the capacitor charge time can be altered. This in turn changes the time over which each resistor terminates its associated line and allows some adjustment of the termination network to account for various rise times of the high frequency pulses.

Thus, the preferred embodiment can be used with any supply line and any sequence of high frequency pulse, and the resistance seen by the supply at the motor terminals can be altered by a user to be almost identical to the characteristic impedance $Z_0$ of the line.

The effectiveness of the inventive termination network in eliminating line voltage reflections was experimentally verified with an 8 KHZ PWM invertor drive, 54 ft of 3 phase supply cable and a 10HP AC induction motor. Invertor output voltage pulses and reduced motor terminal voltage without and with the proposed termination network are shown in FIGS. 7(a) and (b) respectively.

Figure 7A:
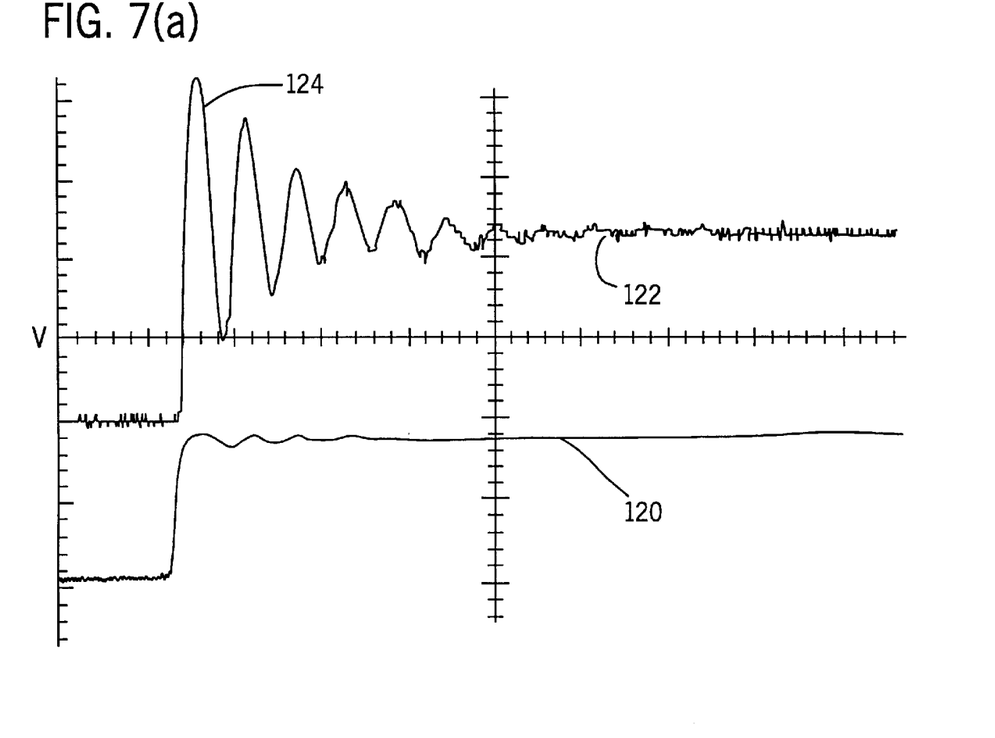
FIGS. 7(a) and (b) are graphs showing experimental waveforms generated without and with the inventive termination network respectively.
Figure 7B:
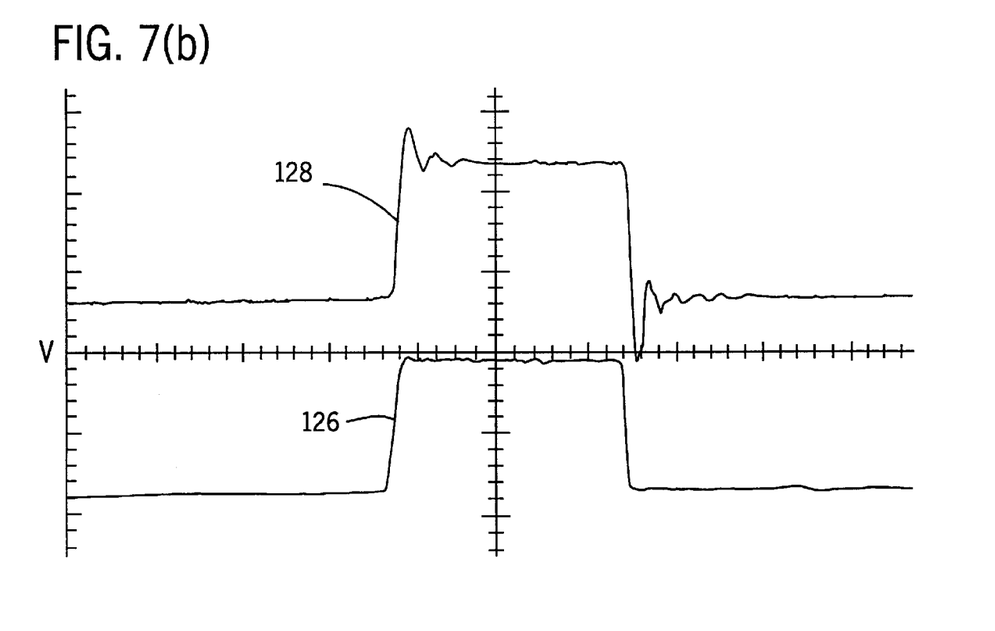

In FIG. 7(a), an invertor output signal 120 and resulting motor terminal signal 122 can be observed. Clearly, without the termination network, the signal 122 at the motor terminals oscillates and reaches nearly twice the desired amplitude 124. In FIG. 7(b), an invertor output signal 126 and resulting motor terminal signal 128 generated using the inventive cable termination network can be observed. With the network, the terminal signal 128 is nearly identical to the invertor signal 126 with little voltage reflection. Similar results were derived in tests using a 2 KHZ 500HP invertor, a long supply line cable of 300 ft, and a 500HP AC induction motor. A line termination network for AC motors has been described. While the motor industry has become accustomed to using large inductors and capacitors to filter out the harmful effects of voltage surges, the present invention recognizes that smaller capacitors combined with resistors can eliminate voltage surges due to reflected voltage waves by matching line impedance to termination impedance.

It should be understood that the above described embodiments are simply illustrative of the principles of this invention. Various other modifications and changes may be made by those skilled in the art which will embody the principles of the invention and fall within the spirit and scope thereof. For example, while the invention has been described as having three separate jumper wires to select discrete resistor values, clearly only one mechanism would be needed that effectively chooses identical resistor values to be used between the lines 14', 16', and 18'. In addition, many more resistors could be included between each two lines 14', 16', and 18' allowing a user to choose resistances that are much closer to the actual impedance of the line.

In addition, each resistor 94, 95, and 96 of FIG. 5 could be configured in a different manner such that various discrete resistor values could be chosen in a different manner. For example, the plurality of resistors could be arranged in a parallel manner with a series of switches, the switches being opened and closed to increase or decease the cumulative resistor value.

In order to appraise the public of the various embodiments that may fall within the scope of the invention, the following claims are made.

I claim:

1. An apparatus for eliminating reflected line voltages on the supply lines of an AC motor, the motor having three stator windings, each stator winding connected separately to an alternating voltage source by either a first, second or third supply line, the voltage source supplying high frequency voltage pulses on each supply line, each supply line having a characteristic line impedance, the apparatus comprising:

a first electrically resistive element positioned between the first and second supply lines;

a first voltage storage element positioned in series with the first resistive element between the first and second supply lines;

a second electrically resistive element positioned between the second and third supply lines;

a second voltage storage element positioned in series with the second resistive element between the second and third supply lines;

a third electrically resistive element positioned between the third and first supply lines; and a third voltage storage element positioned in series with the third resistive element between the third and first supply lines;

wherein the elements between the first and second lines are separate from the elements between the second and third lines and the elements between the first and third lines, and, the elements between the second and third lines are separate from the elements between the first and third lines; and wherein each resistive element has an impedance approximately equal to a characteristic impedance of the supply lines, and each voltage storage element conducts while charging to a maximum level equal to the amplitude of the high frequency voltage pulse and decreases its conductance until the maximum level is achieved, and achieves this maximum level within the period of a single high frequency voltage pulse.

2. The apparatus as recited in claim 1 wherein the resistive elements are resistors and each voltage storage element is a capacitor.

3. The apparatus as recited in claim 2 wherein the resistors are variable resistors.

4. The apparatus as recited in claim 3 wherein the variable resistors can be set to resistance between 50Ω and 250Ω.

5. The apparatus as recited in claim 4 wherein each resistor element can produce a series of discrete different resistive values at each different resistive value being at least 10Ω greater than a nearest lower resistive value.

6. The apparatus as recited in claim 2 wherein the at least one capacitor consists of at least two capacitors in parallel and a switch is positioned in series with one of the capacitors which can be opened or closed to adjust a cumulative capacitance between the supply lines.

7. The apparatus as recited in claim 1 further including three jumper terminals, the first jumper terminal connected adjacent the first resistive element, the second jumper terminal connected adjacent the second resistive element, and the third jumper terminal connected adjacent the third resistive element, and each of the first, second, and third resistive elements consist of a plurality of resistors in series;

a plurality of resistor terminals, one resistor terminal extending from between each two adjacent resistors; and a jumper wire having a fixed end and a distal end, the fixed end connected to the jumper terminal and the distal end maneuverable;

whereby the distal end can be maneuvered between positions wherein the distal end may contact each of the resistor terminals separately thus bypassing certain of said resistors and changing the effective resistance of the resistive element.

8. An apparatus for eliminating reflected line voltages on the supply lines of an AC motor, the motor having three stator windings, each stator winding connected to a voltage source by one of three separate supply lines, the apparatus comprising:

a first resistive element positioned between the first and second lines, a second resistive element positioned between the second and third lines, and a third resistive element positioned between the third and first lines, each of the first, second, and third resistive elements includes of a plurality of resistors in series and a plurality of resistor terminals, one resistor terminal extending from between each two adjacent resistors;

three capacitive elements, one capacitive element positioned in series with each separate resistive element;

three jumper terminals, one jumper terminal positioned adjacent each of the first, second, and third resistive elements; and a jumper wire having a fixed end and a free end, the fixed end connected to the jumper terminal and the free end maneuverable;

whereby the free end can be maneuvered between positions wherein the free end may contact each of the resistor terminals separately thus changing the effective resistance of the resistive element.

9. An apparatus for eliminating reflected line voltages on the supply lines of an AC motor, the motor having three stator windings, each stator winding connected to a voltage source by one of three separate supply lines, the voltage source supplying high frequency voltage pulses on each supply line, each supply line having a characteristic impedance, the apparatus comprising:

first, second and third variable resistors, the first variable resistor positioned between the first and second lines, a second variable resistor positioned between the second and third lines, and a third variable resistor positioned between the third and first lines each variable resistor having an impedance approximately equal to the line impedance; and three capacitors, one capacitor positioned in series with each separate variable resistor;

whereby prior to receiving a voltage pulse each capacitor is unchanged and operates as a short circuit, upon receiving a voltage pulse each capacitor begins to charge, upon fully charging each capacitor operates as an open circuit, and after the voltage pulse has passed, the capacitor discharges and returns to a short circuit state.

\* \* \* \* \*